(12) United States Patent
Cacciaguerra

(10) Patent No.: US 8,820,673 B2
(45) Date of Patent: Sep. 2, 2014

(54) ROTARY-WING AND FIXED-WING AIRCRAFT

(75) Inventor: Bruno Cacciaguerra, Aix en Provence (FR)

(73) Assignee: Airbus Helicopters, Marignane Cedex (FR)

( * ) Notice: Subject to any disclaimer, the term of this patent is extended or adjusted under 35 U.S.C. 154(b) by 106 days.

(21) Appl. No.: 13/526,899

(22) Filed: Jun. 19, 2012

(65) Prior Publication Data

US 2013/0175383 A1 Jul. 11, 2013

(30) Foreign Application Priority Data

Jun. 24, 2011 (FR) ...................................... 11 01952

(51) Int. Cl.
*B64C 27/22* (2006.01)
*B64C 39/06* (2006.01)
*B64C 27/26* (2006.01)

(52) U.S. Cl.
CPC ............... *B64C 27/26* (2013.01); *B64C 39/062* (2013.01)
USPC ................................ 244/6; 244/7 A; 244/7 C

(58) Field of Classification Search
USPC .......................... 244/7 A, 7 C, 45 R, 45 A, 46
See application file for complete search history.

(56) References Cited

U.S. PATENT DOCUMENTS

| 1,570,121 | A | * | 1/1926 | Berliner ............................. 244/6 |
| 1,719,048 | A | | 7/1929 | Ehmig |
| D304,821 | S | * | 11/1989 | Ratony ........................ D12/331 |
| 5,078,339 | A | * | 1/1992 | Lapidot ............................ 244/49 |
| 5,332,177 | A | * | 7/1994 | Boyle, Jr. .................... 244/34 A |
| 5,899,410 | A | * | 5/1999 | Garrett ........................ 244/45 R |
| 6,098,923 | A | * | 8/2000 | Peters, Jr. .................... 244/45 R |
| 6,786,450 | B1 | * | 9/2004 | Einstein ............................ 244/2 |
| 2006/0157614 | A1 | * | 7/2006 | Simpson .......................... 244/6 |

(Continued)

FOREIGN PATENT DOCUMENTS

| DE | 20303024 U1 | 8/2003 |
| FR | 550679 A | 3/1923 |

(Continued)

OTHER PUBLICATIONS

"Aile en anneau" Wikipedia, May 30, 2011, XP002673698. URL:http://fr.wikipedia.org/wiki/Alie_en_anneau.

(Continued)

*Primary Examiner* — Christopher P Ellis
*Assistant Examiner* — Medhat Badawi
(74) *Attorney, Agent, or Firm* — Brooks Kushman P.C.

(57) ABSTRACT

An aircraft (1) having a fuselage (2), the aircraft (1) comprising a rotary wing (9) above the fuselage (2) and an extra fixed wing (10), the rotary wing (9) being above both the fuselage (2) and the fixed wing (10), said fixed wing (10) comprising at least one closed wing (20) comprising a first half-wing (21) and a second half-wing (22). Each half-wing (21, 22) is provided with a top lift portion (30) and a bottom lift portion (40), said bottom lift portion (40) of a half-wing being arranged in the wake (S) of the top lift portion (30) of that half-wing, the wake (S) being generated by a stream of air (F) coming from said rotary wing (9) and impacting against the top face (30') of the top lift portion (30) when said aircraft (1) has a forward speed less than a predetermined threshold.

17 Claims, 2 Drawing Sheets

(56) References Cited

U.S. PATENT DOCUMENTS

| | | |
|---|---|---|
| 2007/0095970 A1 | 5/2007 | Richardson |
| 2010/0051755 A1* | 3/2010 | Nichols et al. ............... 244/45 R |
| 2010/0078526 A1 | 4/2010 | Mulero Valenzuela |
| 2010/0200703 A1* | 8/2010 | Cazals et al. ................ 244/45 R |
| 2010/0243820 A1* | 9/2010 | Lim .............................. 244/7 A |
| 2010/0243821 A1* | 9/2010 | Lim .............................. 244/7 A |
| 2011/0036954 A1* | 2/2011 | Piasecki ....................... 244/7 A |
| 2011/0108675 A1* | 5/2011 | Tuval ........................... 244/45 R |
| 2011/0114798 A1 | 5/2011 | Gemmati |

FOREIGN PATENT DOCUMENTS

| | | |
|---|---|---|
| FR | 616764 A | 2/1927 |
| FR | 2952612 A1 | 5/2011 |
| GB | 274534 A | 7/1927 |
| WO | 2008003455 A1 | 1/2008 |

OTHER PUBLICATIONS

Search Report and Written Opinion; Application No. FR 1101952; dated Apr. 20, 2012.

* cited by examiner

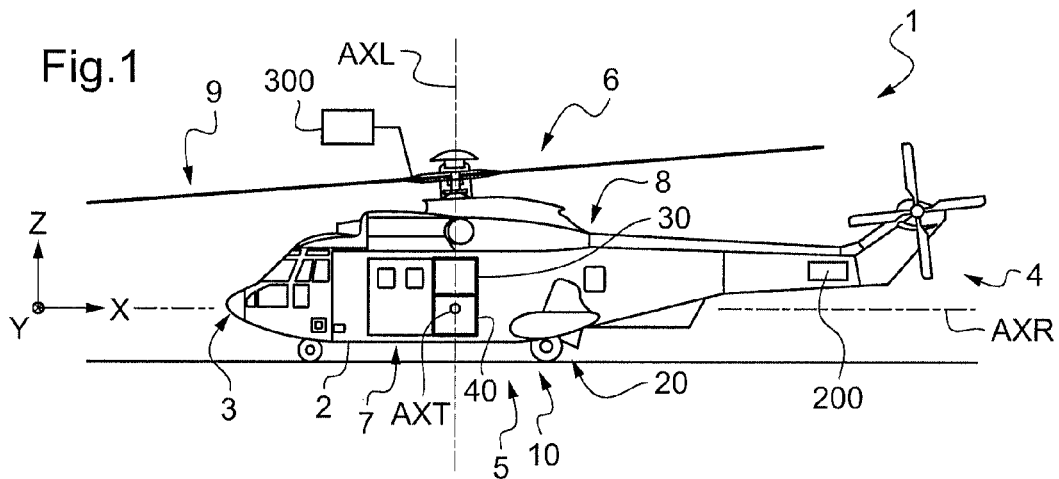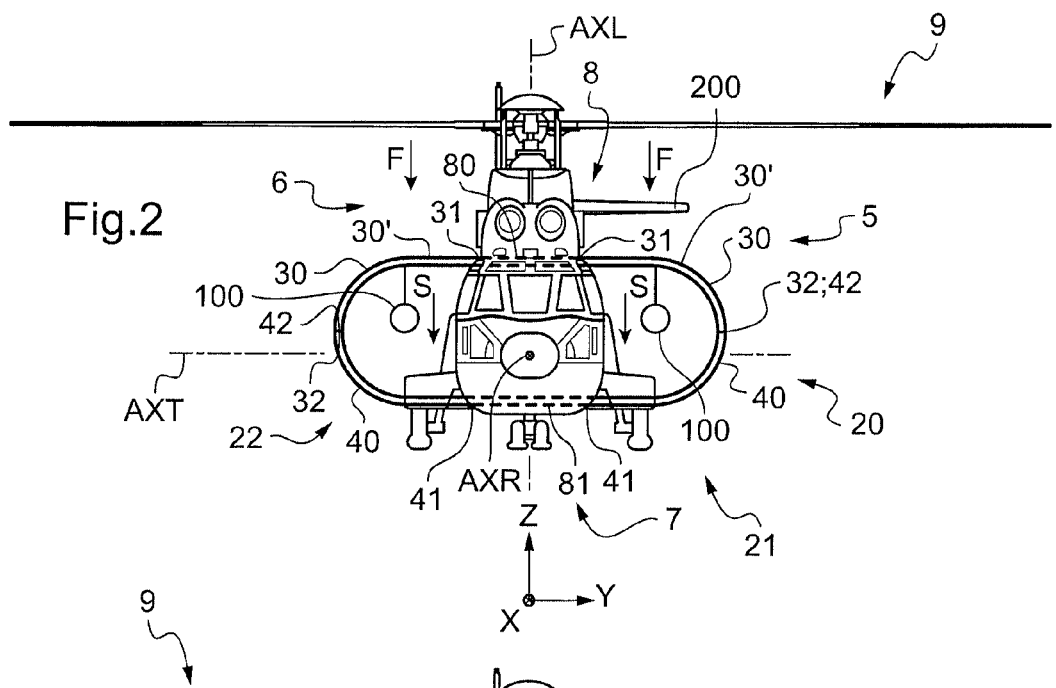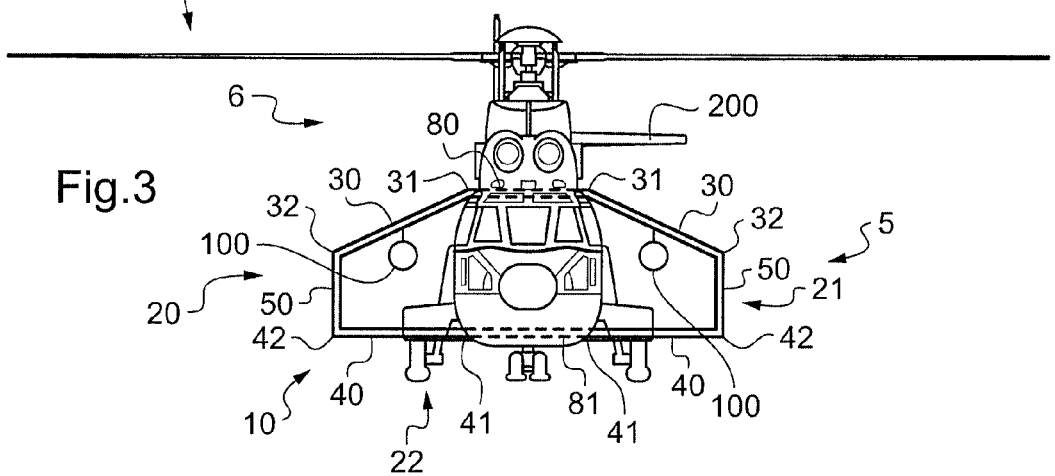

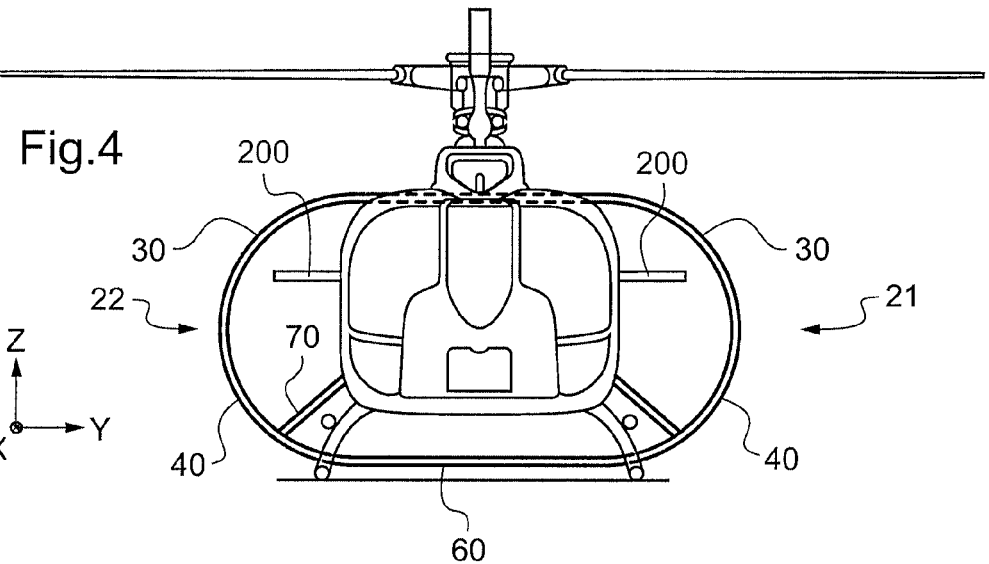
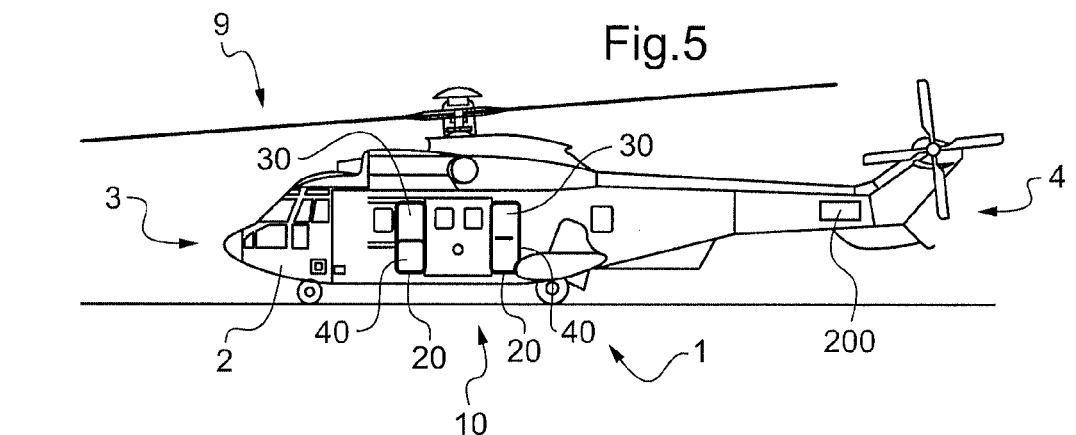
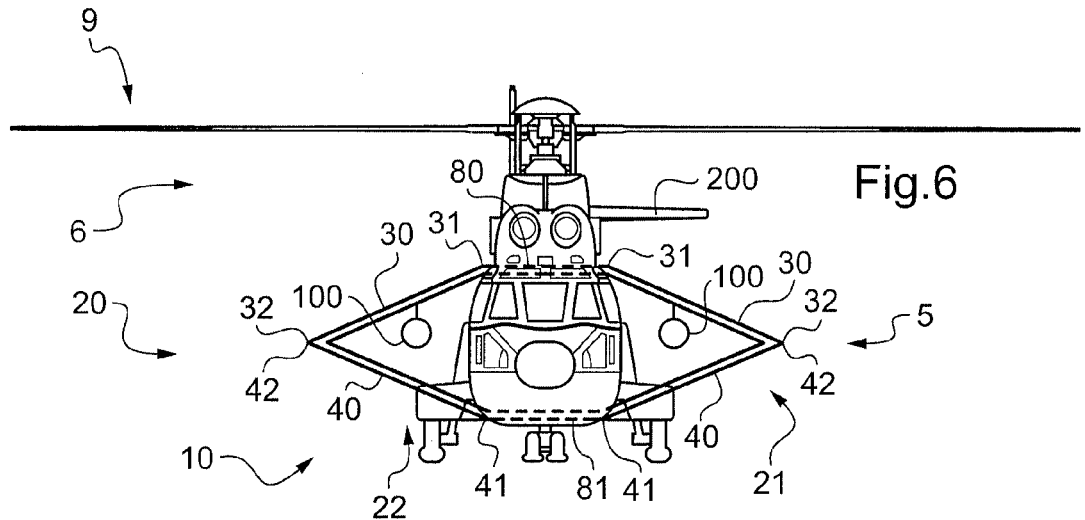

ROTARY-WING AND FIXED-WING AIRCRAFT

CROSS REFERENCE TO RELATED APPLICATIONS

The present application claims priority to French patent application no. FR 11 01952 filed on Jun. 24, 2011, the disclosure of which is incorporated in its entirety by reference.

BACKGROUND OF THE INVENTION (1) Field of the Invention

The present invention relates to an aircraft having both a rotary wing and a fixed wing. The invention thus lies in the particular technical field of rotorcraft.

More particularly, the invention relates to an aircraft capable of vertical takeoff and landing, which is able to land on an offshore platform for the purpose of ferrying passengers and goods to and from the platform.

(2) Description of Related Art

In order to understand clearly the object of the invention and the specific nature of the technical field concerned, it should be recalled that most flying machines are either airplanes or rotorcraft.

The term "airplane" is used to designate any aircraft for which lift is provided by at least one fixed wing, also referred to as a pair of half-wings. The wing may be continuous in the form of two half-wings that are secured to each other and that extend through the fuselage, or it may be discontinuous, being in the form of two distinct half-wings.

Various techniques are known for reducing the span of the fixed wing and for diminishing its airfoil drag in a longitudinal direction of the aircraft.

In particular, aircraft are known that have at least one closed wing, i.e. a wing that is circular or annular in shape surrounding the fuselage of the airplane.

According to the literature, such a closed wing may give rise to instability in pitching. Reference may be made to the Wikipedia article "aile en anneau", May 30, 2011, XP002673698, taken from the Internet at URL:
http://fr.wikipedia.org/wiki/Aile_en_anneau
[http://en.wikipedia.org/wiki/Closed_wing].

Furthermore, the term "rotorcraft" designates any aircraft in which lift is provided in full or in part by a rotary wing. A rotary wing comprises at least one lift rotor of large diameter arranged above the fuselage.

In the rotorcraft category, there is the autogyro in which the main rotor does not receive power, but autorotates under the effect of the forward speed of the aircraft.

The category of rotorcraft also includes the helicopter in which at least one main rotor driven by a suitable power plant provides both lift and propulsion.

A helicopter can land on an offshore oil platform without difficulty. Nevertheless, the forward speed of a conventional helicopter is low, which prevents it from achieving large ranges, and thus reaching oil platforms that are far away from the shore.

In order to remedy that, various other novel formulas have been studied specifically, and some of them have given rise to practical embodiments.

In particular, aircraft are known that have a rotary wing above the fuselage of the aircraft and a fixed wing for achieving a relatively high forward speed.

Nevertheless, it is found that at low speed and in particular while hovering, the fixed wing presents non-negligible airfoil drag in an elevation direction of the aircraft. This can lead to potential degradation of performance during such stages of flight.

It can be understood that this problem is specific to the very narrow technical field of aircraft having a rotary wing above a fixed wing.

Document WO 2008/003455 proposes an aircraft having a wing made up of two half-wings that are movable in a horizontal plane.

Document US 2007/095970 describes an aircraft having at least one pivoting fixed-wing.

Document DE 20303024 describes an aircraft provided with top and bottom canard type lift planes. The bottom plane is not situated in the wake of the top plane, given the way the planes are arranged.

Document FR 2 952 612 describes a fixed-wing aircraft having both a forward wing and an aft wing.

Document FR 616 764 discloses an aircraft having two contrarotating propellers, a top fixed lift plane and a bottom fixed lift plane.

The following documents are also known: U.S. Pat. No. 1,719,048, GB 274 534, FR 550 679.

BRIEF SUMMARY OF THE INVENTION

An object of the present invention is to provide an aircraft with a rotary wing that presents an alternative to existing solutions, and that can achieve a high forward speed in cruising flight.

According to the invention, an aircraft is provided with a fuselage extending along a roll axis from a front end towards a rear end and along a pitching axis from a first side towards a second side. The aircraft has a rotary wing above the fuselage and an extra fixed wing, the rotary wing being above both the fuselage and the fixed wing.

The aircraft is then provided with a control system for controlling the pitch of the blades of the rotary wing, i.e. a system for controlling the cyclic pitch and/or the collective pitch of said blades.

In addition, the fixed wing is made up of at least one wing comprising a first half-wing extending parallel to the pitching axis from the first side and a second half-wing extending parallel to the pitching axis from the second side.

Each half-wing is provided with a top lift portion and a bottom lift portion, the bottom lift portion of a half-wing being arranged in the wake of the top lift portion of that half-wing, the wake being generated by a stream of air coming from the rotary wing and impacting against a top face of the top lift portion when the aircraft has a forward speed below a predetermined threshold.

It should be recalled that a wake is a region downstream from an obstacle arranged in a moving fluid, in which region the fluid is at rest relative to the obstacle.

Thus, when the aircraft is hovering or flying at low speed, e.g. less than 30 knots (i.e. about 55.6 kilometers per hour), the bottom lift portion of a half-wing lies in the wake of the top lift portion of that half-wing. Each bottom lift portion is in an airfoil "shadow" zone downstream from a top lift portion.

Consequently, the fixed wing of the invention minimizes the area that is impacted by the stream of air passing through the rotary wing.

The invention goes against certain prejudices that consist in believing that a fixed wing arranged in the wake of a rotary wing is likely to induce non-negligible airfoil drag in an elevation direction of the aircraft. Since the area that is impacted by the stream of air passing through the rotary wing is minimized, the fixed wing induces reduced airfoil drag in the elevation direction.

In addition, each top lift portion extends for example from a top proximal end arranged against the fuselage to a top distal end, each bottom lift portion extending from a bottom proximal end in the proximity of the fuselage to a bottom distal end remote from said fuselage.

The terms "distal" and "proximal" should be considered in relative manner, a proximal end being an end that is close to the fuselage or that touches it, whereas a distal end is an end that is remote from the fuselage.

Under such circumstances, each top distal end is connected to a bottom distal end of the half wing either directly or of the half wing indirectly so as to form a wing of the closed type.

Such closed wings tend to give rise to instability in pitching. Under such circumstances, closed wings represent a technology that is no longer in use.

Nevertheless, by associating a closed wing with a rotary wing, it is possible to combat such instability in pitching. By controlling the cyclic pitch of the blades of the rotary wing using conventional control systems, comprising manual means or indeed an autopilot system, it is possible to make use of a closed wing without suffering from its drawbacks.

The invention thus makes it possible to obtain a novel aircraft that goes against prejudices, which prejudices consist in considering an aircraft having a closed wing as being unstable.

The aircraft may have one or more of the following characteristics.

In a variant, each top lift portion of a half-wing is fastened directly to a bottom lift portion of that half-wing. Thus, each top distal end is secured to a bottom distal end.

By way of example, each half-wing may be C-shaped.

In an alternative variant, the top lift portion of a half-wing is fastened indirectly to the bottom lift portion of that half-wing.

By way of example, each top lift portion extends from a top proximal end arranged against the fuselage to a top distal end, each bottom lift portion extends from a bottom proximal end arranged in the proximity of the fuselage to a bottom distal end, each top distal end of a half-wing is secured to an intermediate portion of the half-wing, and the intermediate portion is secured to the bottom distal end.

The intermediate portion may optionally be plane, so that a section of the half-wing in an elevation plane perpendicular to the roll axis and parallel to the pitching axis is in the form of a broken line in three pieces.

In another aspect, the wing may be a discontinuous wing, the first top proximal end of the first half-wing being fastened to the first side of the fuselage, the second top proximal end of the second half-wing being fastened to the second side of the fuselage.

The wing may also be a continuous wing, the first top proximal end of the first half-wing being fastened to the second top proximal end of the second half-wing by a through portion of the wing that passes through the fuselage parallel to the pitching axis.

In a first embodiment, the first bottom proximal end of the first half-wing is optionally fastened to the first side of the fuselage, the second bottom proximal end of the second half-wing being fastened to the second side of the fuselage.

In a second embodiment, the first bottom proximal end of the first half-wing is fastened to the second bottom proximal end of the second half-wing by an airfoil member of the wing, the fuselage being above said airfoil member.

The half-wings of the fixed wing then describe a closed wing going from the first top proximal end of the first half-wing to the second top proximal end of the second half-wing.

In another aspect, the wing may include at least one strut fastening each half-wing to the fuselage in order to optimize the fastening of the half-wing to the fuselage.

Furthermore, the fixed wing may be made up of two wings that may be continuous or discontinuous. These two wings may be arranged respectively in front of and behind a lateral access door of the fuselage, for example.

In addition, said aircraft may be provided with a horizontal tail plane in order to minimize the impact on the pitching movement of the aircraft that results from using at least one closed wing.

Finally, at least one half-wing of a wing may carry equipment, such as propulsion means, a ferrying tank, or any other member.

It should be observed that each half-wing may also include means for controlling the aircraft, such as flaps or ailerons, for example.

BRIEF DESCRIPTION OF THE SEVERAL
VIEWS OF THE DRAWINGS

The invention and its advantages appear in greater detail from the following description of embodiments given by way of illustration with reference to the accompanying figures, in which:

FIGS. 1 to 3 are views showing a first embodiment of the invention;

FIG. 4 is a view showing a second embodiment of the invention;

FIG. 5 is a view showing a variant having two sets of half-wings; and

FIG. 6 is a view showing a variant of the invention.

DETAILED DESCRIPTION OF THE INVENTION

Elements that are shown in more than one of the figures are given the same references in each of them.

Three mutually orthogonal directions X, Y, and Z are shown in the figures.

The first direction X is said to be longitudinal. The roll axis of the aircraft shown is parallel to this first direction.

The second direction Y is said to be transverse. The pitching axis of the aircraft shown is parallel to this second direction.

Finally, the third direction Z is said to be in elevation. The yaw axis of the aircraft shown is parallel to this third direction.

FIG. 1 shows an aircraft in a first embodiment.

In all embodiments and variants, the aircraft 1 has a fuselage 2. The fuselage 2 extends along a roll axis AXR from a front end 3 towards a rear end 4, along a pitching axis AXT from a first side 5 to a second side 6, and along a yaw axis AXL from a bottom face 7 to a top face 8.

It should be observed that the first side may be referred to as the "port" side and the second side may be referred to as the "starboard" side, using terminology taken from watercraft.

Furthermore, the aircraft 1 has a rotary wing 9 situated above the fuselage 2 and specifically above the top face 8 of the fuselage 2.

The aircraft is provided with a control system 300 for controlling the cyclic and/or collective pitch of the blades of the rotary wing 9. This control system may include a cyclic stick, a collective pitch lever, servo-controls, and an autopilot device.

The control system 300 is of a type usually to be found on a helicopter, and it is therefore not described in detail herein. Reference may be made to the literature to obtain additional information, should that be necessary.

In addition to a rotary wing, the aircraft 1 has an extra fixed wing 10, the rotary wing 9 being situated above the fixed wing 10.

The fixed wing 10 comprises at least one closed wing 20. For example, the fixed wing is made up of one closed wing 20 in the variant of FIG. 1, or of two closed wings 20 in the variant of FIG. 5. It should be observed that these two closed wings may be arranged respectively in front of and behind a side door 100, e.g. a door in the first side 5.

Furthermore, the aircraft may include a horizontal tail plane 200.

FIG. 2 shows a front view of an aircraft 1 in a first variant of the first embodiment.

Independently of the embodiment, each wing 20 possesses a first half-wing 21 extending laterally along the pitching axis AXT from the first side 5.

The first half-wing 21 has a top lift portion 30 extending from a top proximal end 31 arranged close to the fuselage 2, more precisely in contact with the fuselage 2 in FIG. 2, towards a top distal end 32 remote from the fuselage 2.

In addition, the first half-wing is provided with a bottom lift portion 40 extending from a bottom proximal end 41 arranged close to the fuselage 2, more precisely in contact with the fuselage 2 in FIG. 2, towards a bottom distal end 42 remote from the fuselage 2.

Likewise, each wing 20 possesses a second half-wing 22 extending laterally along the pitching axis AXT from the second side 6. The second half-wing 22 is provided with a top lift portion 30 extending from a top proximal end 31 arranged close to the second side 6 of the fuselage 2, more precisely in contact with the second side 6 in FIG. 2, towards a top distal end remote from the fuselage. In addition, the second half-wing 22 is provided with a bottom lift portion 40 extending from a bottom proximal portion 41 arranged close to the fuselage 2, more precisely in contact with the second side 6 in FIG. 2, towards a bottom distal end 42 remote from the fuselage 2.

It can be understood that the first distance between the fuselage and a proximal end of a given half-wing portion is less than a second distance between the fuselage and a distal end of that half-wing portion.

Furthermore, it should be observed that the bottom lift portion 40 of a half-wing is arranged in the wake S of the top lift portion 30 of that half-wing. This wake S is generated by a stream of air F coming from the rotary wing 9 and impacting against a top face 30' of the top lift portion 30 when the aircraft 1 has a forward speed below a predetermined threshold.

Furthermore, in the first variant, the top distal end 32 of the top lift portion 30 is fastened directly to the bottom distal end 42 of the bottom lift portion 40.

It can be understood that the top lift portion 30 and the bottom lift portion 40 may constitute a single part that is C-shaped in FIG. 2.

With reference to FIG. 6, other shapes may be envisaged. Each top lift portion 30 and each bottom lift portion 40 may be plane and the portions may be joined together at their bottom and top distal ends 32 and 42.

With reference to FIG. 3, in a second variant, the top distal end 32 of the top lift portion 30 is fastened indirectly to the bottom distal end 42 of the bottom lift portion 40 by an intermediate portion.

Under such circumstances, the top distal end 32 of a half-wing is secured to an intermediate portion 50 of that half-wing, with the intermediate portion 50 also being secured to the bottom distal end 42 of the half-wing.

The intermediate portion 50 is optionally plane, with a section of the half-wing being in the form of a broken line made up of three pieces in a plane in elevation that is perpendicular to the roll axis and parallel to the pitching axis, i.e. in the plane of the sheet of FIG. 3.

In another aspect, each half-wing 21, 22 carries equipment 100, such as a thrust unit, a ferrying tank, or any other type of optional member, for example.

In addition, the wing may be a discontinuous wing.

Under such circumstances, a first proximal end of the first half-wing 21 is secured to the first side 5 of the fuselage 2, while a second proximal end of the second half-wing 22 is secured to the second side 6 of the fuselage.

For example, the first top proximal end 31 of the first half-wing 21 is secured to the first side 5 of the fuselage 2, the second top proximal end 31 of the second half-wing 22 being secured to the second side 6 of the fuselage. In alternative or additional manner, the first bottom proximal end 41 of the first half-wing 21 may optionally be secured to the first side 5 of the fuselage 2, the second bottom proximal end 41 of the second half-wing 22 being secured to the second side 6 of the fuselage.

In a variant, the wing may be continuous.

Thus, a first proximal end of the first half-wing is fastened to a second proximal end of the second half-wing by a through portion 80 of the wing that passes through the fuselage parallel to the pitching axis.

For example, a first top proximal end 31 of the first half-wing 21 may be fastened to the second top proximal end 31 of the second half-wing 22 by a top through portion 80 of the wing that passes through the fuselage parallel to the pitching axis. In alternative or additional manner, a first bottom proximal end 41 of the first half-wing 21 may be fastened to the second bottom proximal end 41 of the second half-wing 22 by a bottom through portion 81 of the wing passing through the fuselage parallel to the pitching axis.

In a first embodiment of FIG. 3, each proximal end 31, 41 of a lift portion 30, 40 is in contact with the fuselage.

If the wing is discontinuous, the first top proximal end 31 of the first half-wing 21 is secured to the first side 5 of the fuselage 2, the second top proximal end 31 of the second half-wing being secured to the second side 6 of the fuselage. In addition, the first bottom proximal end 41 of the first half-wing is secured to the first side 5 of the fuselage 2, the second bottom proximal end 41 of the second half-wing 22 being secured to the second side 6 of the fuselage.

If the wing is continuous, the first top proximal end 31 of the first half-wing 21 may be fastened to the second top proximal end 31 of the second half-wing 22 by a top through portion of the wing that passes through the fuselage parallel to the pitching axis. In addition, a first bottom proximal end 41 of the first half-wing 21 may be fastened to the second bottom proximal end 41 of the second half-wing 22 by a bottom through portion 81 of the half-wing that passes through the fuselage parallel to the pitching axis.

The wing then forms a closed wing with each half-wing representing a respective portion that projects from the fuselage.

In the second embodiment shown in FIG. 4, only one proximal end of each half-wing is in contact with the fuselage. The other two proximal ends of the half-wings are then connected together by an airfoil member extending from one side of the fuselage to the other side of the fuselage.

For example, the first top proximal end 31 of the first half-wing 21 is fastened to the first side 5 of the fuselage, the second top proximal end 31 of the second half-wing 22 being fastened to the second side 6 of the fuselage.

Under such circumstances, the first bottom proximal end of the first half-wing 21 is fastened to the second bottom proximal end 41 of the second half-wing 22 by the airfoil member 60 of the wing. It should be observed that the fuselage 2 is above this airfoil member 60.

In another aspect, each wing may include at least one strut 70 for fastening each half-wing to the fuselage 2, and for example for fastening each bottom lift portion 40 to the fuselage.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An aircraft provided with a fuselage extending along a roll axis (AXR) from a front end to a rear end, and along a pitching axis (AXT) from a first side to a second side, the aircraft having a rotary wing above the fuselage and a fixed wing, the aircraft having a control system for controlling the pitch of the blades of the rotary wings, the rotary wing being above both the fuselage and the fixed wing, said fixed wing being made up of at least one wing comprising:
    a first half-wing extending parallel to the pitching axis from said first side, and
    a second half-wing extending parallel to the pitching axis from said second side,
    wherein each half-wing is provided with a top lift portion and a bottom lift portion, said bottom lift portion of a half-wing being arranged in the wake (S) of the top lift portion of that half-wing, the wake (S) being generated by a stream of air (F) coming from said rotary wing and impacting against the top face of the top lift portion when said aircraft is hovering,
    wherein each top lift portion extends from a top proximal end arranged against the fuselage towards a top distal end, each bottom lift portion extending from a bottom proximal end in the proximity of the fuselage to a bottom distal end remote from said fuselage, with each top distal end being connected to a bottom distal end, and
    wherein each top distal end is secured and fastened directly to a bottom distal end.

2. An aircraft according to claim 1, wherein said at least one wing is a discontinuous wing, the first top proximal end of the first half-wing being fastened to the first side of the fuselage, the second top proximal end of the second half-wing being fastened to the second side of the fuselage.

3. An aircraft according to claim 1, wherein said at least one wing is a continuous wing, the first top proximal end of the first half-wing being fastened to the second top proximal end of the second half-wing by a through portion of the at least one wing that passes through the fuselage parallel to the pitching axis.

4. An aircraft according to claim 1, wherein the first bottom proximal end of the first half-wing is fastened to the first side of the fuselage, the second bottom proximal end of the second half-wing being fastened to the second side of the fuselage.

5. An aircraft according to claim 1, wherein the first bottom proximal end of the first half-wing is fastened to the second bottom proximal end of the second half-wing by an airfoil member of the at least one wing, said fuselage being above said airfoil member.

6. An aircraft according to claim 1, wherein said at least one wing includes at least one external strut for fastening each half-wing to the fuselage.

7. An aircraft according to claim 1, wherein said fixed wing is made up of two half-wing pairs.

8. An aircraft according to claim 1, wherein at least one half-wing carries a piece of equipment.

9. An aircraft according to claim 1, wherein said aircraft is provided with a horizontal tail plane.

10. An aircraft comprising:
    a fuselage extending along a roll axis (AXR) from a front end to a rear end, and along a pitching axis (AXT) from a first side to a second side;
    a rotary wing above the fuselage,
    a control system for controlling the pitch of the blades of the rotary wing, and
    a fixed wing comprising:
    a first half-wing extending parallel to the pitching axis from said first side and,
    a second half-wing extending parallel to the pitching axis from said second side,
    at least one strut for fastening each half-wing to the fuselage, and
    an airfoil member positioned below said fuselage, the airfoil member fastening the first bottom proximal end of the first half-wing to the second bottom proximal end of the second half-wing,
    wherein each half-wing is provided with a top lift portion and a bottom lift portion, said bottom lift portion of a half-wing being arranged in the wake (S) of the top lift portion of that half-wing, the wake (S) being generated by a stream of air (F) coming from said rotary wing and impacting against the top face of the top lift portion when said aircraft is hovering, wherein each top lift portion extends from a top proximal end arranged against the fuselage towards a top distal end, each bottom lift portion extending from a bottom proximal end in the proximity of the fuselage to a bottom distal end remote from said fuselage, with each top distal end being secured and fastened directly to a bottom distal end;
    wherein the rotary wing is above both the fuselage and the fixed wing.

11. An aircraft comprising:
    a fuselage extending along a roll axis (AXR) from a front end to a rear end, and along a pitching axis (AXT) from a first side to a second side;
    a rotary wing supported by and above the fuselage,
    a control system for controlling the pitch of the blades of the rotary wing, and
    a fixed wing comprising:
    a first closed half-wing extending parallel to the pitching axis from said first side and,
    a second closed half-wing extending parallel to the pitching axis from said second side;
    wherein each half-wing is provided with a top lift portion and a bottom lift portion positioned directly beneath the top lift portion, said bottom lift portion of a half-wing being arranged in the wake (S) of the top lift portion of that half-wing, the wake (S) being generated by a stream of air (F) coming from said rotary wing and impacting against the top face of the top lift portion when said aircraft is hovering, wherein each top lift portion extends from a top proximal end arranged against the fuselage towards a top distal end, each bottom lift portion extending from a bottom proximal end in the proximity of the fuselage to a bottom distal end remote from said fuselage, with each top distal end is secured and fastened directly to a bottom distal end; and wherein the rotary wing is above both the fuselage and the fixed wing.

12. The aircraft of claim 11 wherein the fixed wing is a first fixed wing, the aircraft further comprising a second fixed wing spaced apart from the first fixed wing along a longitudinal axis of the aircraft, the second fixed wing comprising:

a third closed half-wing extending parallel to the pitching axis from said first side and, a fourth closed half-wing extending parallel to the pitching axis from said second side;

wherein each half-wing is provided with a top lift portion and a bottom lift portion positioned directly beneath the top lift portion, said bottom lift portion of a half-wing being arranged in the wake (S) of the top lift portion of that half-wing, the wake (S) being generated by a stream of air (F) coming from said rotary wing and impacting against the top face of the top lift portion when said aircraft has a forward speed slower than a predetermined threshold, wherein each top lift portion extends from a top proximal end arranged against the fuselage towards a top distal end, each bottom lift portion extending from a bottom proximal end in the proximity of the fuselage to a bottom distal end remote from said fuselage, with each top distal end is secured and fastened directly to a bottom distal end; and wherein the rotary wing is above both the fuselage and the fixed wing.

13. The aircraft of claim 11 wherein the top lift portion and bottom lift portion of each of the half-wings are curved towards one another.

14. The aircraft of claim 11 wherein the top lift portion and bottom lift portion of each of the half-wings are generally planar.

15. The aircraft of claim 11 further comprising:

an airfoil member of the fixed wing, the airfoil member fastening the first bottom proximal end of the first half-wing to the second bottom proximal end of the second half-wing, wherein the first bottom proximal end of the first half-wing, the second bottom proximal end of the second half-wing, and the airfoil member are spaced apart and disconnected from the fuselage; and first and second external struts, each strut connected the fuselage to the top face of a respective bottom lift portion of a half-wing.

16. The aircraft of claim 11 wherein the first and second half wings are in a fixed position on the fuselage.

17. The aircraft of claim 11 further comprising at least one of a propulsive unit and a ferrying tank supported by one of the half-wings and positioned between the top and bottom lift portions.

* * * * *